US008565075B2

(12) United States Patent
Russell et al.

(10) Patent No.: US 8,565,075 B2
(45) Date of Patent: Oct. 22, 2013

(54) METHOD AND SYSTEM FOR DETERMINING ALTERNATE PATHS

(75) Inventors: James N. Russell, Tulsa, OK (US);
Kenny M. Hawkins, Tulsa, OK (US);
Chad M. Renfro, Collinsville, OK (US);
Bob E. Taylor, Owasso, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 429 days.

(21) Appl. No.: 12/261,366

(22) Filed: Oct. 30, 2008

(65) Prior Publication Data
US 2010/0110883 A1  May 6, 2010

(51) Int. Cl.
*G01R 31/08* (2006.01)

(52) U.S. Cl.
USPC ............................................. 370/228

(58) Field of Classification Search
USPC ......... 370/203, 216–228, 241–258, 351–363, 370/386–388, 395.31, 395.32
See application file for complete search history.

(56) References Cited

U.S. PATENT DOCUMENTS

| | | | | |
|---|---|---|---|---|
| 4,956,835 A * | 9/1990 | Grover | | 370/228 |
| 5,430,729 A * | 7/1995 | Rahnema | | 370/409 |
| 5,987,027 A * | 11/1999 | Park et al. | | 370/360 |
| 5,999,286 A * | 12/1999 | Venkatesan | | 398/5 |
| 6,047,331 A * | 4/2000 | Medard et al. | | 709/239 |
| 6,134,671 A * | 10/2000 | Commerford et al. | | 714/4 |
| 6,835,482 B2 * | 12/2004 | Kawamoto et al. | | 429/19 |
| 6,850,486 B2 * | 2/2005 | Saleh et al. | | 370/218 |
| 7,404,005 B1 * | 7/2008 | Burton et al. | | 709/238 |
| 7,525,978 B1 * | 4/2009 | Tabatabaee et al. | | 370/411 |
| 7,599,620 B2 * | 10/2009 | Graves et al. | | 398/51 |
| 7,688,740 B1 * | 3/2010 | Jacobson et al. | | 370/238 |
| 2002/0073393 A1 * | 6/2002 | Campbell et al. | | 716/12 |
| 2004/0047439 A1 * | 3/2004 | Kaewell et al. | | 375/349 |
| 2004/0205239 A1 * | 10/2004 | Doshi et al. | | 709/241 |
| 2006/0149782 A1 * | 7/2006 | Yeh et al. | | 707/103 X |
| 2007/0189191 A1 * | 8/2007 | Ades | | 370/254 |
| 2009/0016331 A1 * | 1/2009 | Shah et al. | | 370/356 |
| 2009/0168768 A1 * | 7/2009 | Chiabaut et al. | | 370/389 |
| 2009/0245218 A1 * | 10/2009 | Nguyen | | 370/340 |
| 2010/0014859 A1 * | 1/2010 | D'Alessandro et al. | | 398/48 |
| 2010/0067414 A1 * | 3/2010 | Morita | | 370/310 |
| 2010/0266279 A1 * | 10/2010 | Sadananda | | 398/48 |

\* cited by examiner

*Primary Examiner* — Jung-Jen Liu

(57) ABSTRACT

An approach is provided for determining alternative paths. Information is stored specifying a set of available paths among network elements within a connection-oriented network. The available paths are sorted according to a predetermined criterion. The sorted paths are selectively filtered based on either a particular one of the network elements, a region associated with one or more of the network elements, or a combination thereof.

20 Claims, 12 Drawing Sheets

METHOD AND SYSTEM FOR DETERMINING ALTERNATE PATHS

BACKGROUND INFORMATION

Modern communication networks are growing in size and complexity. As the number of consumers increases and services evolve in sophistication, the performance of these networks can degrade, in part, from link and/or equipment failure. Telecommunication networks rely on connection-oriented (e.g., circuit-switched systems), to transport voice traffic as well as data traffic. Such networks utilize digital cross-connect systems (DXC or DCS) to multiplex and switch low-data rate signals onto higher speed connections. Additionally, DXCs provide a capability to switch paths to avoid network faults, for example. In typical carrier networks, the number of DXCs can be quite large, resulting in numerous alternate paths through the network. Consequently, tracking and determining the circuits and paths throughout the network, particularly if different networks are involved, can be daunting. Traditionally, such determination of paths and associated switching among the paths are highly inefficient and manually intensive.

Therefore, there is a need for an approach that provides for efficiently determining alternate paths in a communications network.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for determining available alternate paths are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a connection-oriented (e.g., circuit-switched) network, it is contemplated that these embodiments have applicability to any communication system capable of providing alternate paths from a source node to a destination node.

Figure 1:
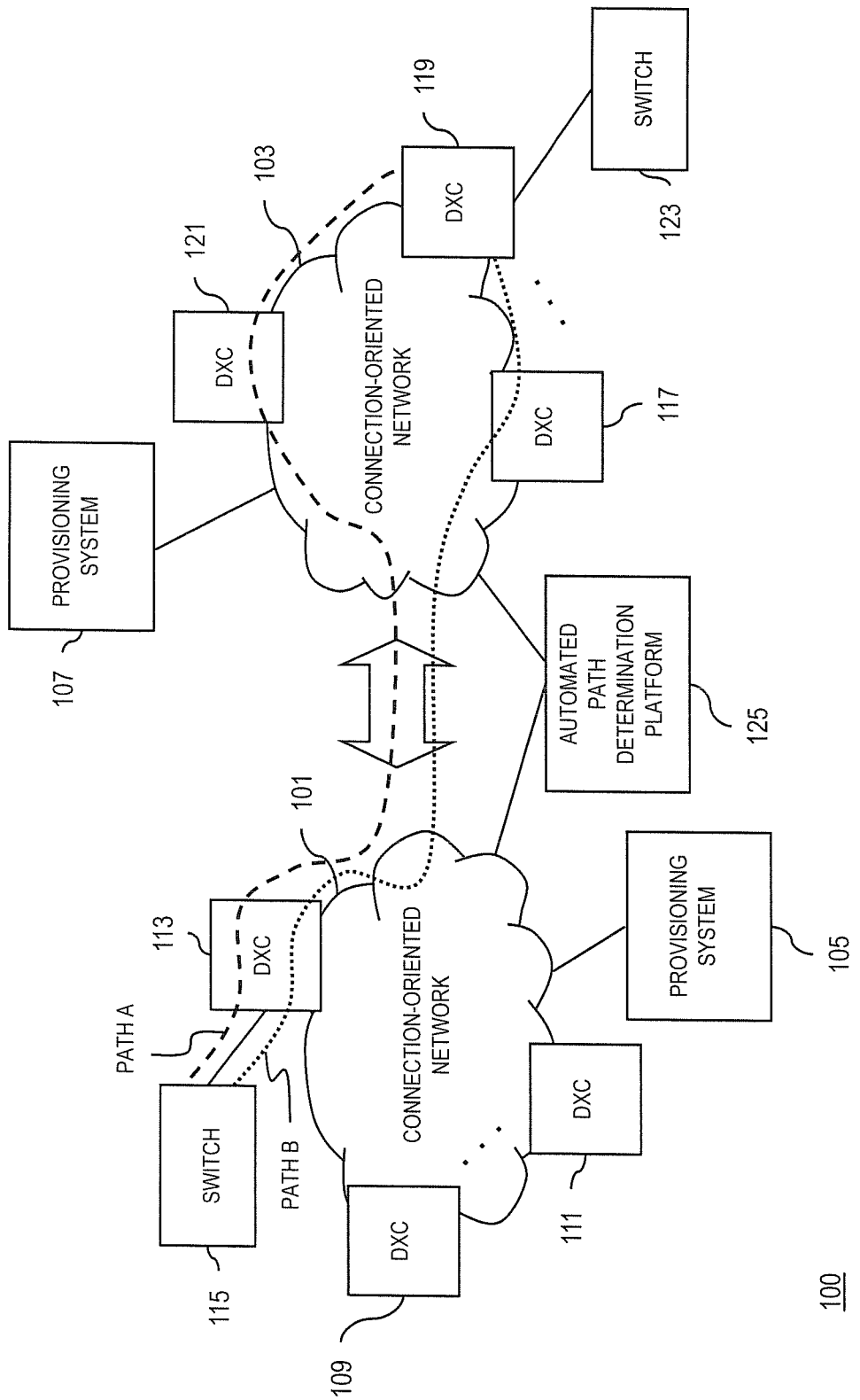
FIG. 1 is a diagram of a system capable of automatically determining available alternate paths, according to various exemplary embodiments.

FIG. 1 is a diagram of a system capable of automatically determining available alternate paths, according to various exemplary embodiments. As shown, a communications system 100 includes connection-oriented networks 101, 103, which utilize a system of digital cross connects (DXCs) to establish communication paths. By way of example, the networks 101, 103 are circuit-switched networks that are operated by different service providers, in which the particular circuits are provisioned by different provisioning systems 105, 107, respectively. The network 101 includes multiple DXCs 109-113; in this example, the DXCs 109, 111 can reside within the same physical facility. The DXC 113 provides connectivity to a switch 115 (e.g., voice switch). Similarly, the connection-oriented network 103 deploys one or more DXCs 117-121 as a transport network, wherein a switch 123 is served by DXC 119. The DXCs are more fully described with respect to FIG. 2B. The switches 115, 123 can be either a voice switch or a data switch.

An automated path determination platform 125, which resides within the network 101 or the network 103, provides management of the DXCs 109-113 of the network 101 as well as DXCs 117-121 of the network 103. The platform 125 can communicate with both provisioning systems 105, 107 to acquire information about the topologies of the networks 101 and 103 with respect to the network elements 109-113 and 117-121. Conventionally, the topology information can be created based on circuit identifiers (IDs) and ports of the DXCs 109-113 and 117-121. However, as will be more evident later, circuit IDs are not required to determine the alternate paths, under an approach utilized by the platform 125. That is, the platform 125 identifies available facility based DXC paths between two locations. For instance, during outage or jeopardy situations, these paths are used for alternate routing purposes. Under the scenario of FIG. 1, path A originates from DXC 113 serving switch 115 and traverses network 101 to DXC 121 of network 103 and terminates at DXC 119. An alternative path to path A is path B, which encompasses DXC 113 and DXC 117. These paths A and B can be designated as primary and secondary paths, respectively. In such an arrangement, the traffic of source switch 115 can still be transported to destination switch 123, even though path A experiences a problem (e.g., failed equipment or physical cut of a line). Alternate paths can be utilized during outage situations where time to repair is unknown or prolonged. This can be critical, as prolonged outages can negatively affect revenue. As such, efficient alternate route resolution has a direct impact on lost revenue.

To better appreciate the operations of the platform 125, it is instructive to describe traditional alternate routing schemes. Using the system 100 of FIG. 1, the complexity of manually establishing a path between two site locations can be shown. Traditionally, a user or agent of the network 101 logs into the provisioning system 105, 107 to manually query each leg (or segment) of a given communication path. However, this process can be time-consuming (e.g., in a relatively large network, it may require 30 minutes to determine one path), not to mention the associated cost to train the user on the provisioning systems 105, 107.

Figure 2A:
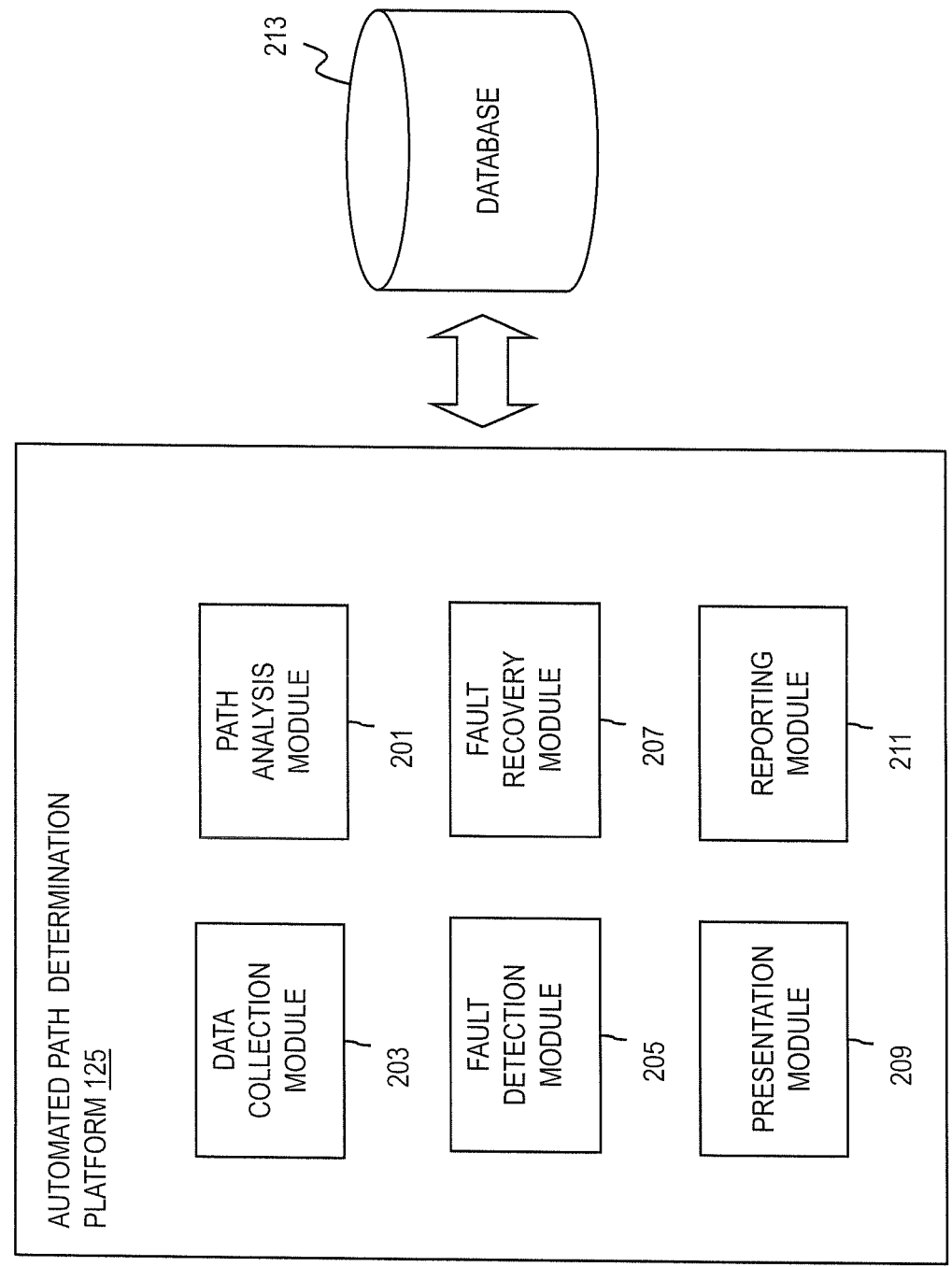
FIGS. 2A and 2B are, respectively, a diagram of an automated route determination platform and a diagram of an exemplary digital cross-connect, each of which is configured to operate in the system of FIG. 1, according to an exemplary embodiment.
Figure 2B:
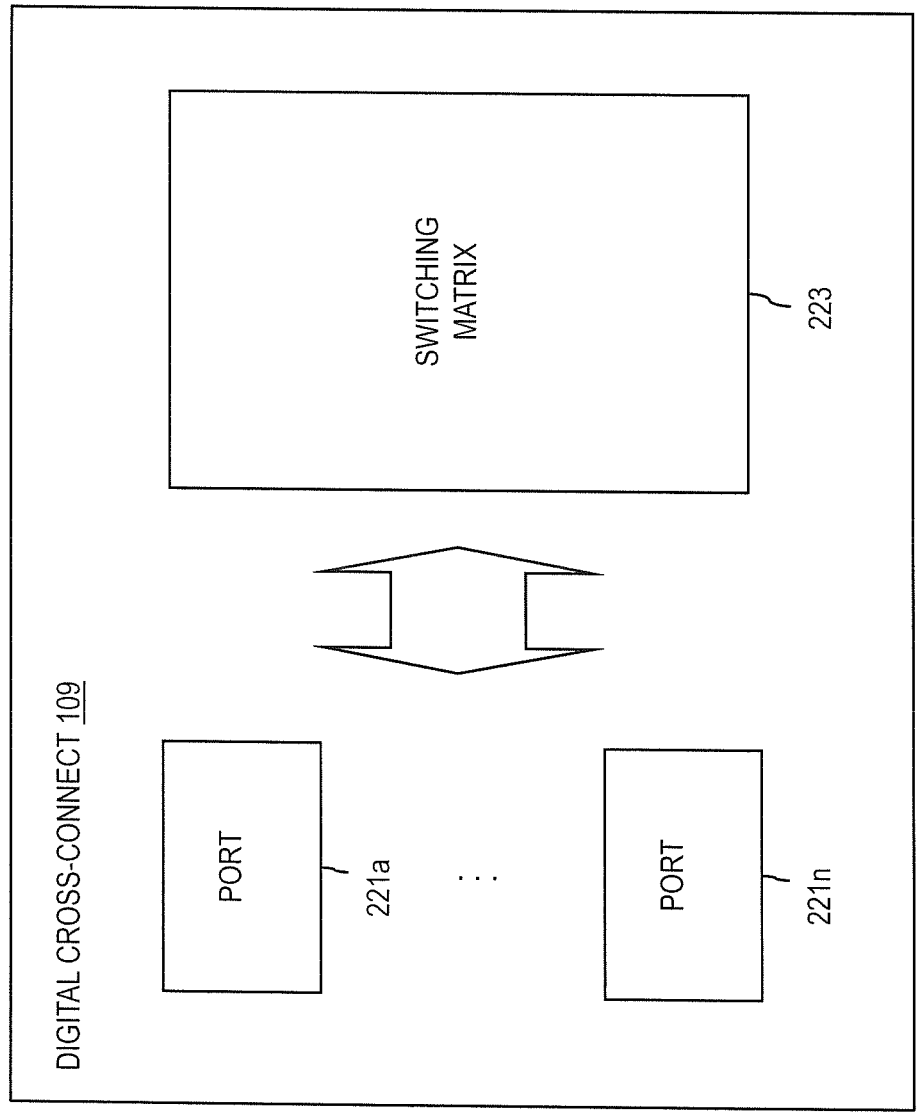

FIGS. 2A and 2B are, respectively, a diagram of an automated route determination platform and a diagram of an exemplary digital cross-connect, each of which is configured to operate in the system of FIG. 1, according to an exemplary embodiment. For the purposes of illustration, the platform 125 includes a path analysis module 201 to determine the alternate paths within the circuit-switched environment of FIG. 1. Also, a data collection module 203 is employed to gather necessary topology information from the provisioning system 105, 107. The platform 125 may additionally include modules 205, 207 to perform fault detection and recovery in conjunction with the path analysis. A presentation module 209 can display a graphical user interface (GUI) to a user for specifying criteria or rules associated with the path analysis, and for outputting the results for selection. A reporting module 211 can also be included to provide reporting capabilities for the user. In this example, a database 213 can be configured to store path analysis parameters and results.

The operation of this platform 125 is now explained below with respect to FIG. 3.

For the purposes of illustration, a digital cross-connect (DCS or DXC), such as DXC 109, includes numerous ports 221a-221n for receiving ingress traffic and for forwarding egress traffic. DXCs switch circuits by making internal logical connections between external physical ports in response to external control. Accordingly, a switching matrix 223 switches among the ports 221a-221n. To efficiently transmit signals, multiple circuits of the same capacity are combined or multiplexed together into a single carrier (e.g., "trunk"). In one embodiment, multiplexing hierarchy can be based on a Synchronous Digital Hierarchy (SDH): DS-0 circuits (or Digital Signal Level 0) with a capacity of up to 64 kilobits per second (Kbps); DS-1 circuits of 1.544 megabits per second (Mbps) or 24 DS-0s; DS-2 circuits of 6.312 Mbps or 4 DS-1s; and DS-3 circuits of 44.736 Mbps or 7 DS-2s.

For example, the DXC 109 can be a DXC 3/3 node that switches DS3 (Digital Signal 3, which is a level 3 T-carrier with a rate of 44.736 Mbps) signals, a hybrid DXC 3/1 node that switches DS1 (rate of 1.544 Mbps) and DS3 signals, and/or a DXC 1/0 node that switches DS1 and DS0 (rate of 64 kbps) signals. In addition to electrical DXCs, it is contemplated that the DXC 109 can also be an optical cross-connect (OXC) for use in an optical networking environment.

Thus, depending on the application, the DXC 109 can process Synchronous Digital Hierarchy (SDH) signals as well as SDH/SONET (Synchronous Digital Hierarchy/Synchronous Optical Network) signals. For instance, long-haul transmission equipment such as fiber-optic systems can combine a certain number of DS-3s; e.g., SONET OC-48 (Optical Carrier Level 48) combines 48 DS-3 circuits.

Figure 3:
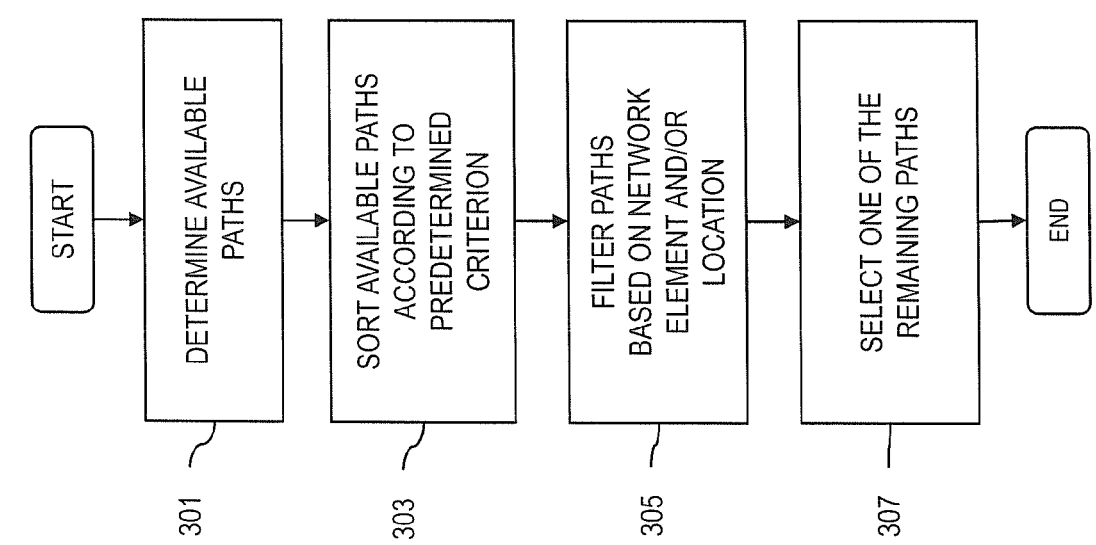
FIG. 3 is a flowchart of a process for determining available alternate paths, according to an exemplary embodiment.

FIG. 3 is a flowchart of a process for determining available alternate paths, according to an exemplary embodiment. In step 301, the platform 125 determines the available paths from a source network element (or node), e.g., DXC 113, to a destination network element, e.g., DXC 119. The available paths are then sorted according to a predetermined criterion (or criteria), as in step 303. The criteria can be based on hop length, or any other metric. The hop count then is the number of subsequent legs (or segments) along the path from source node to destination node. Next, the platform 125 can filter the sorted paths using, according to one embodiment, a particular network element and/or location (step 305). This filtering capability thus permits the non-selection of a particular DXC (e.g., the DXC has been known to be unreliable) or a DXC within a certain location (e.g., if the location is generally overloaded with heavy traffic). In step 307, a path from the remaining ones is selected for use. It is noted that this process is automated, and does not require manually accessing the particular provisioning systems, or manually enumerating and evaluating the available paths.

According to certain embodiments, the path analysis can depend on whether the communication path is an egress to ingress (i.e., egress/ingress) or an ingress to egress (i.e., ingress/egress), as next described.

Figure 4A:
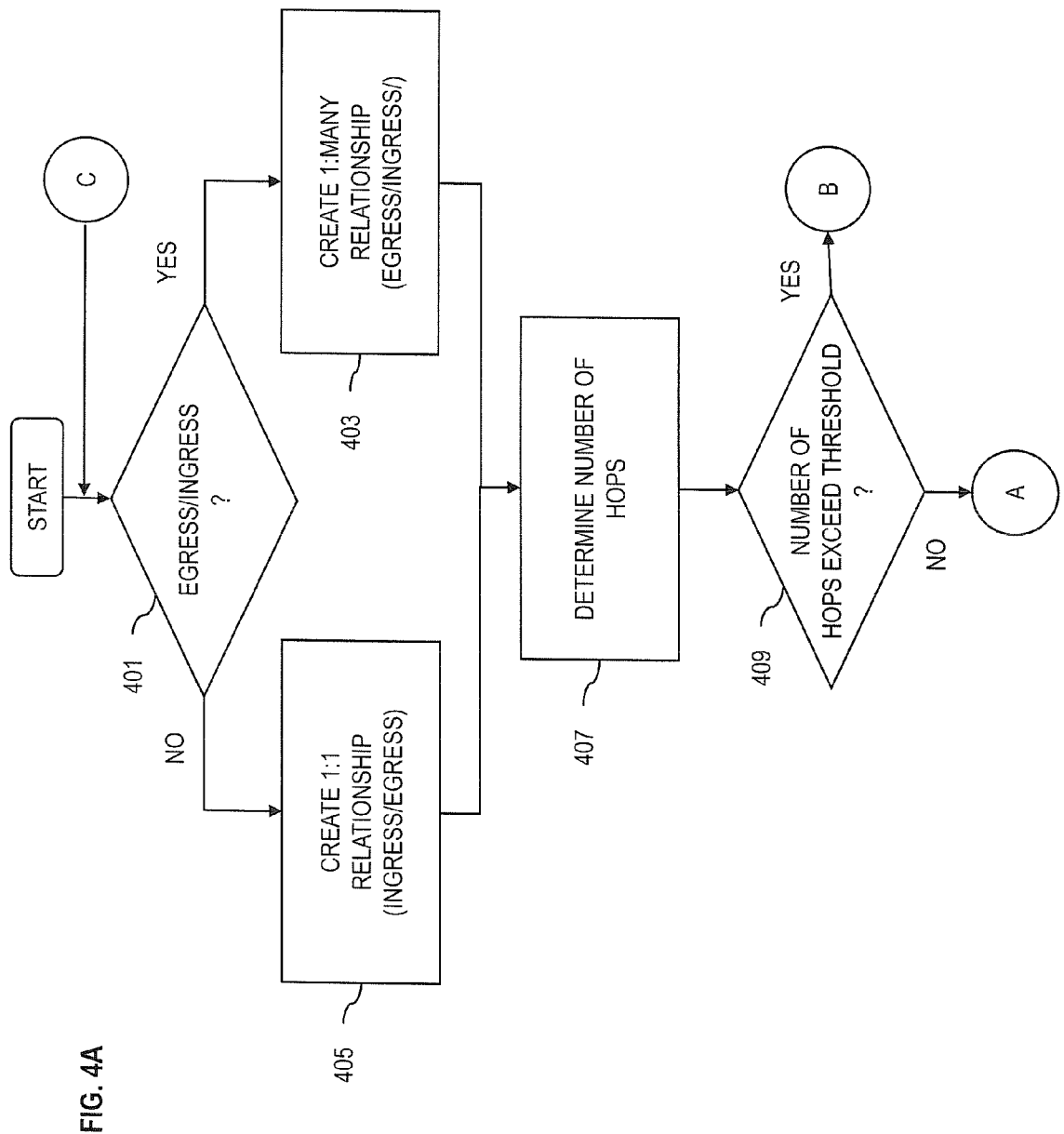
FIGS. 4A and 4B are a flowchart of a path analysis process, according to an exemplary embodiment.
Figure 4B:
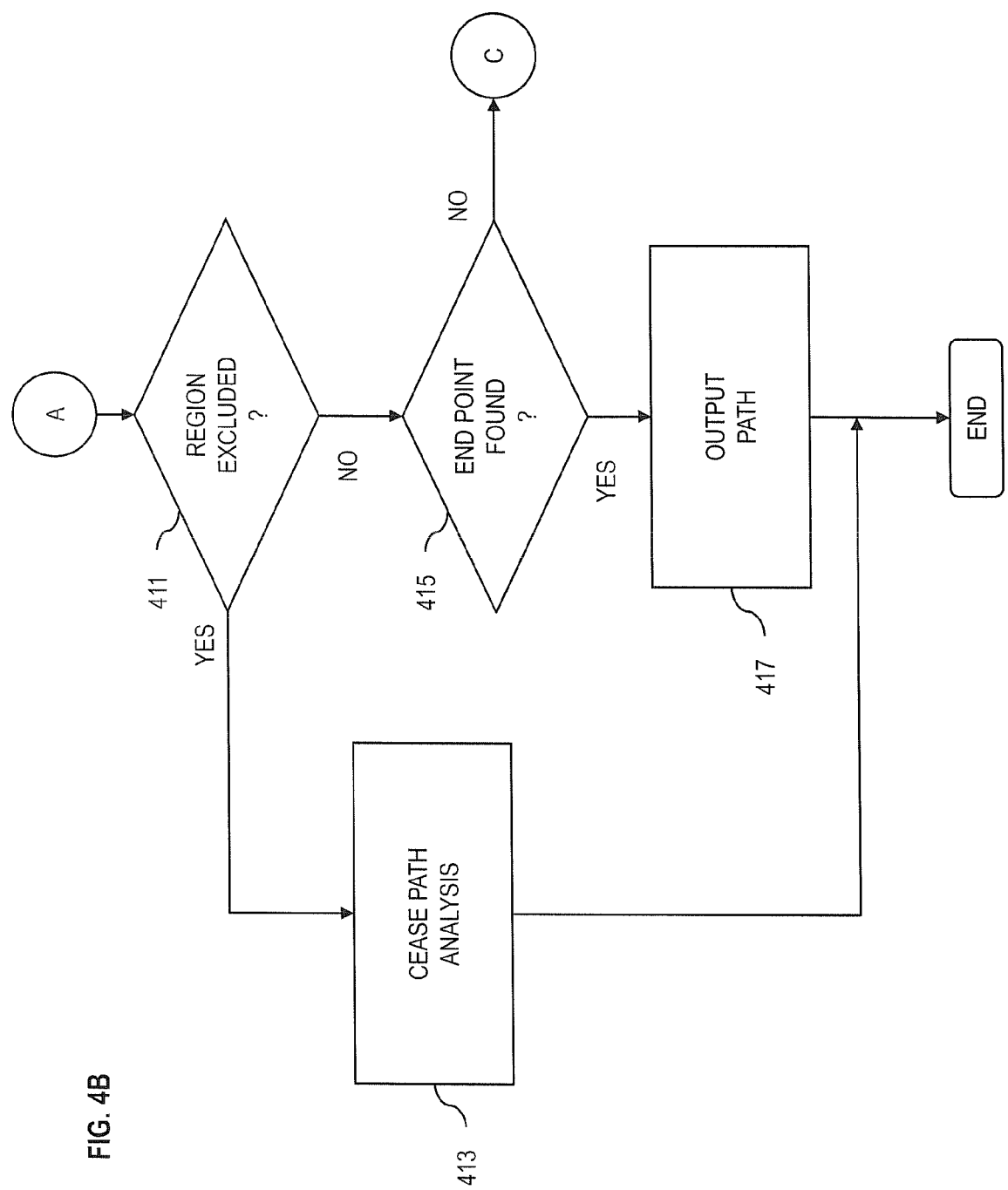

FIGS. 4A and 4B are a flowchart of a path analysis process, according to an exemplary embodiment. In step 401, the process determines whether the path is Egress/Ingress or Ingress/Egress, wherein an Egress to Ingress path has a 1:N relationship (i.e., 1 to many; N being an integer of 1 or greater) and an Ingress/Egress path has a 1:1 relationship. Hence, in step 403, a 1 to many relationship is created with respect to the alternate paths, and a 1:1 relationship 405 is produced, per step 405.

Upon establishing the appropriate relationship for the path, the process determines the number of hops, as in step 407, for the path. The determined number of hops is compared with a predetermined threshold (which is a configurable parameter), per step 409. For example, the threshold can be set at 5 hops. As shown in FIG. 4B, the region is then analyzed, in which the process determines whether a region is to be excluded, as in step 411. If the node or network element is to be excluded based on region, the path analysis ceases (step 413). Otherwise, the process analyzes the destination DXC, and checks whether an end point is found (step 415). If this is not the end point, then the process loops back to step 401. If the destination node is found, then the path is output (per step 417).

In support of the execution of the above path analysis process, the platform 125 employs a GUI that permits the user to readily view the available paths.

FIGS. 5A-5E are diagrams of an exemplary path and associated graphical user interface (GUT) displaying corresponding path legs, according to an exemplary embodiment. In this example (shown in screen 501), a path 503 originates in Houston, traverses through New Orleans, La., through Jacksonville, then Fla., Coco Beach, Fla., and ends in Miami, Fla. (screen 501 of FIG. 5A). Within a query screen 505 of FIG. 5B, text boxes 507, 509 permit the user to specify an originating (or source) network element using a city identifier and an equipment identifier. Similarly text boxes 511, 513 provide parameters for identifying the destination node. Text boxes 507 and 511 refer to the DXC site name, while text boxes 509 and 513 relate to the DXC equipment ID number (e.g., AA=1, AB=2, AC=3, etc.). In this example, HSJ AA denotes the DXC number 1 at HSJ site; HSJ AB represents DXC 2 at HSJ site. Section 515 illustrates a path structure that specifies the number of hops corresponding to the communication path. Hops represent, in one embodiment, the number of network elements (e.g., DXCs) along a complete path—i.e., from source DXC to destination DXC. In an exemplary embodiment, the structure is expandable and collapsible, so that the user can readily focus on the desired paths.

Also, query screen 505 provides for a Paths button 517 to initiate determination of the available paths. A Stop button 519, upon selection, will halt the path analysis process. An Exclude button 521 eliminates the paths that user designates for removal; as mentioned earlier, the exclusion can be based on network element and/or location. Further, an Exit button 523 allows the user to terminate the application.

Figure 5B:
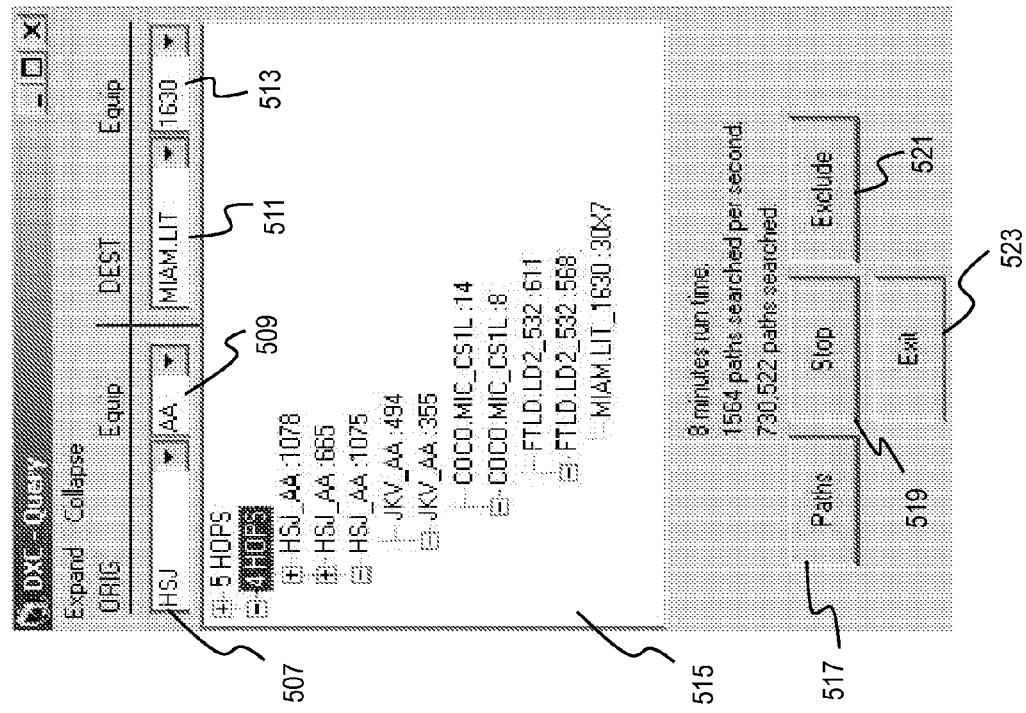
FIGS. 5A-5E are diagrams of an exemplary path and associated graphical user interface (GUI) displaying corresponding path legs, according to an exemplary embodiment.
Figure 5A:
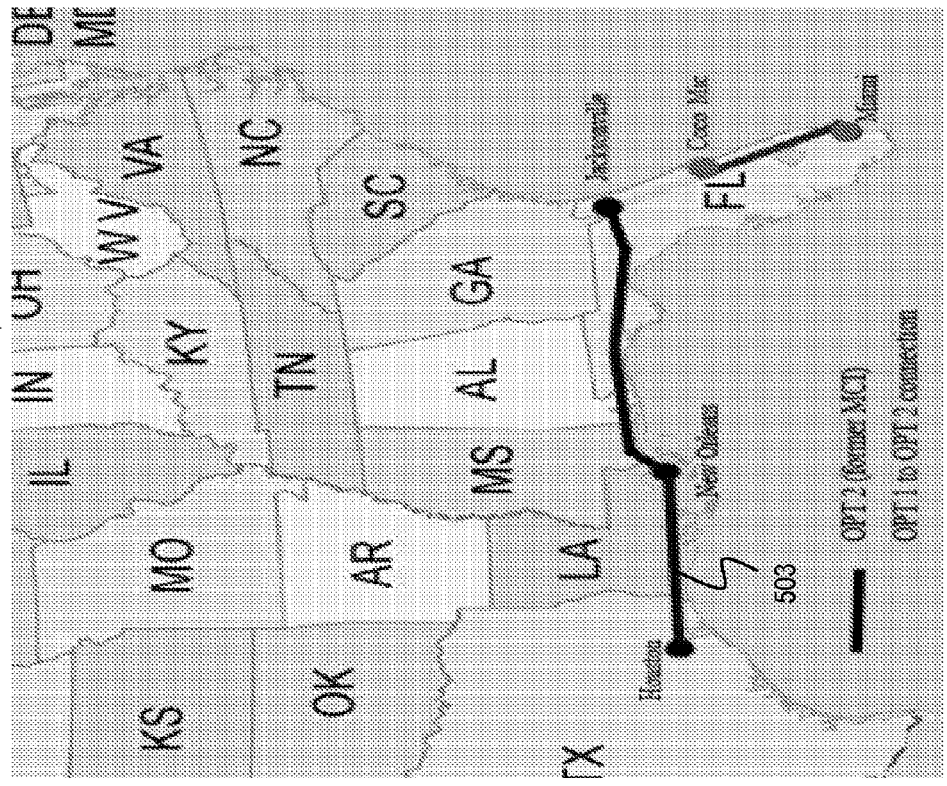
Figure 5D:
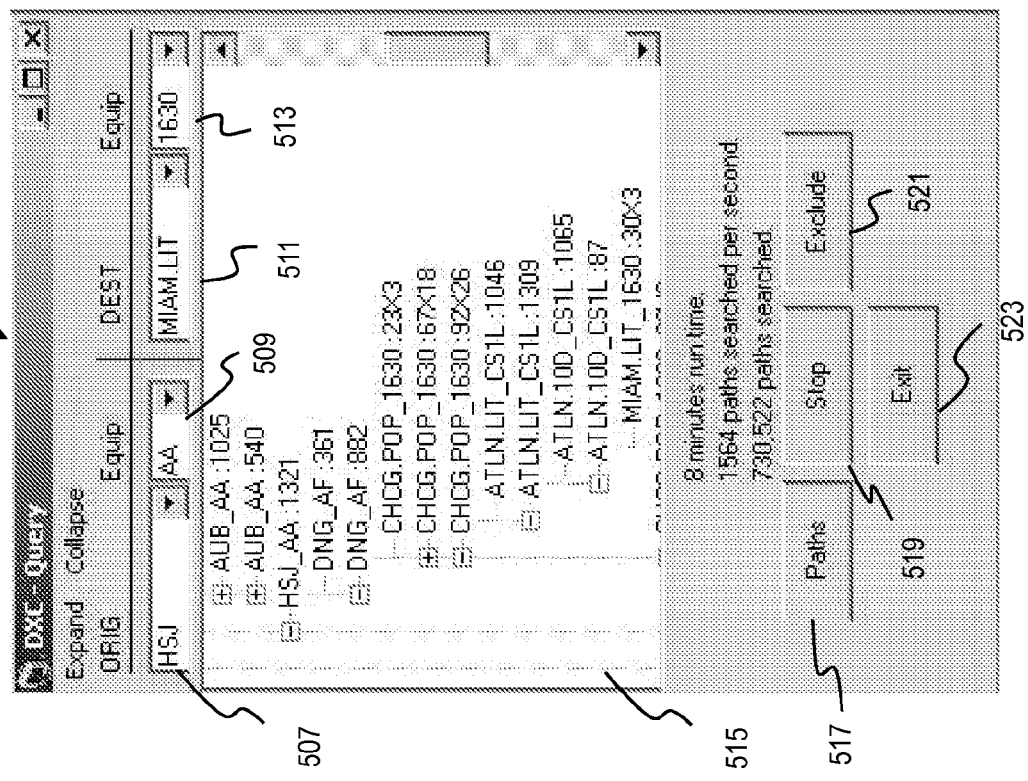
Figure 5C:
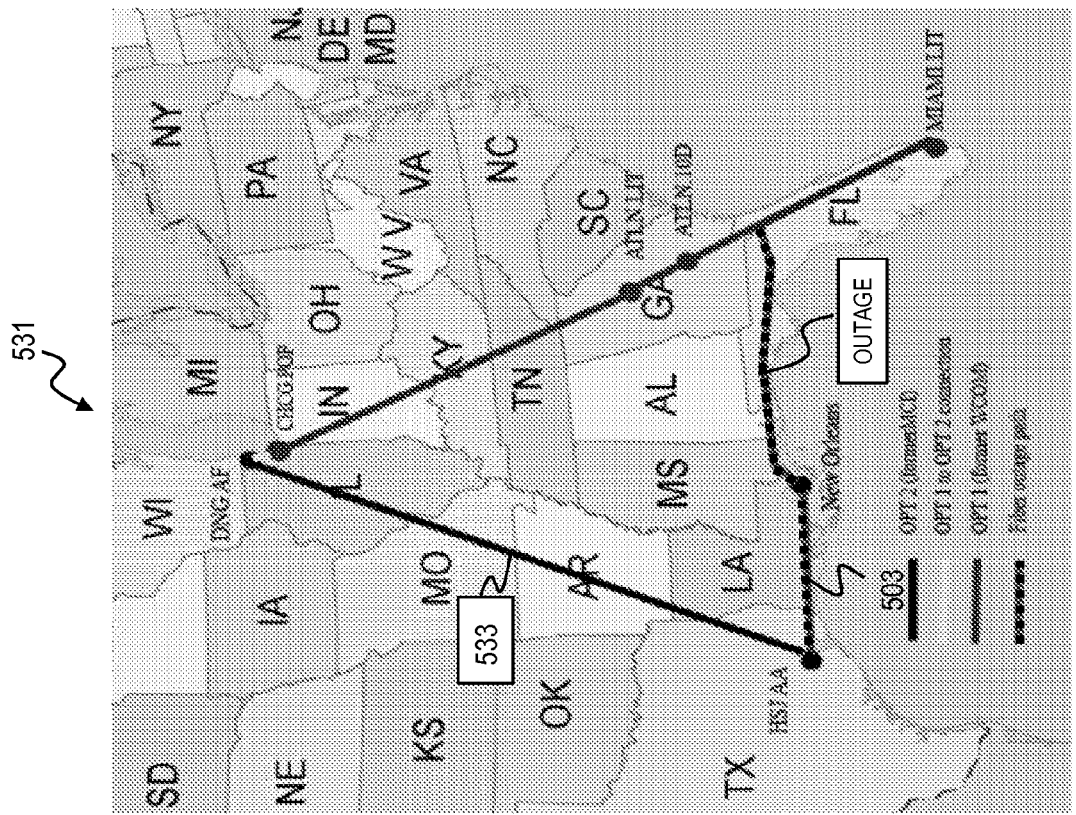

FIG. 5C depicts a screen 531, whereby the path 503 experiences a failure (e.g., outage). As such, an alternate path 533 is determined. Screen 535 of FIG. 5D reflects the alternate path 533.

Figure 5E:
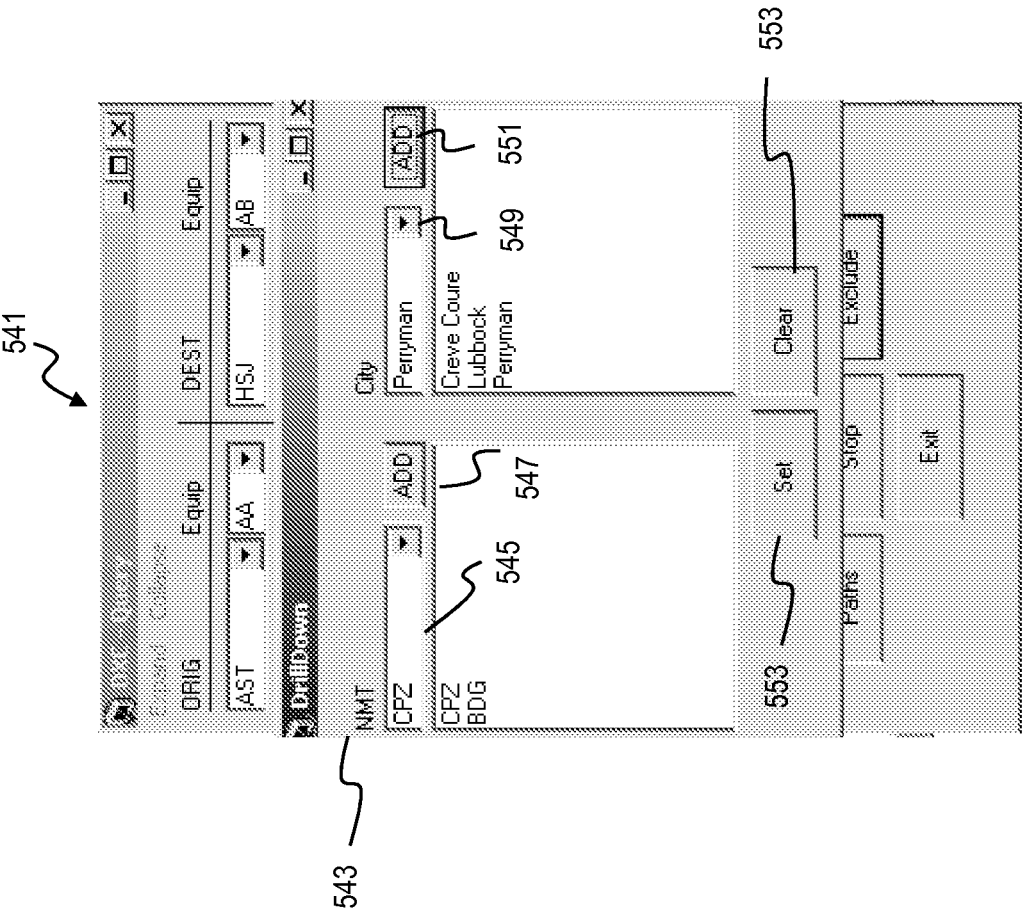

FIG. 5E illustrates a query screen 541 in which a drill down box 543 associated with the query screen 541 permits the user to exclude particular network elements or location. Text boxes 545-551 relate to facilities and city. The Add buttons 547, 551 are used to include additional network elements for exclusion from the set of available paths.

Figure 6:
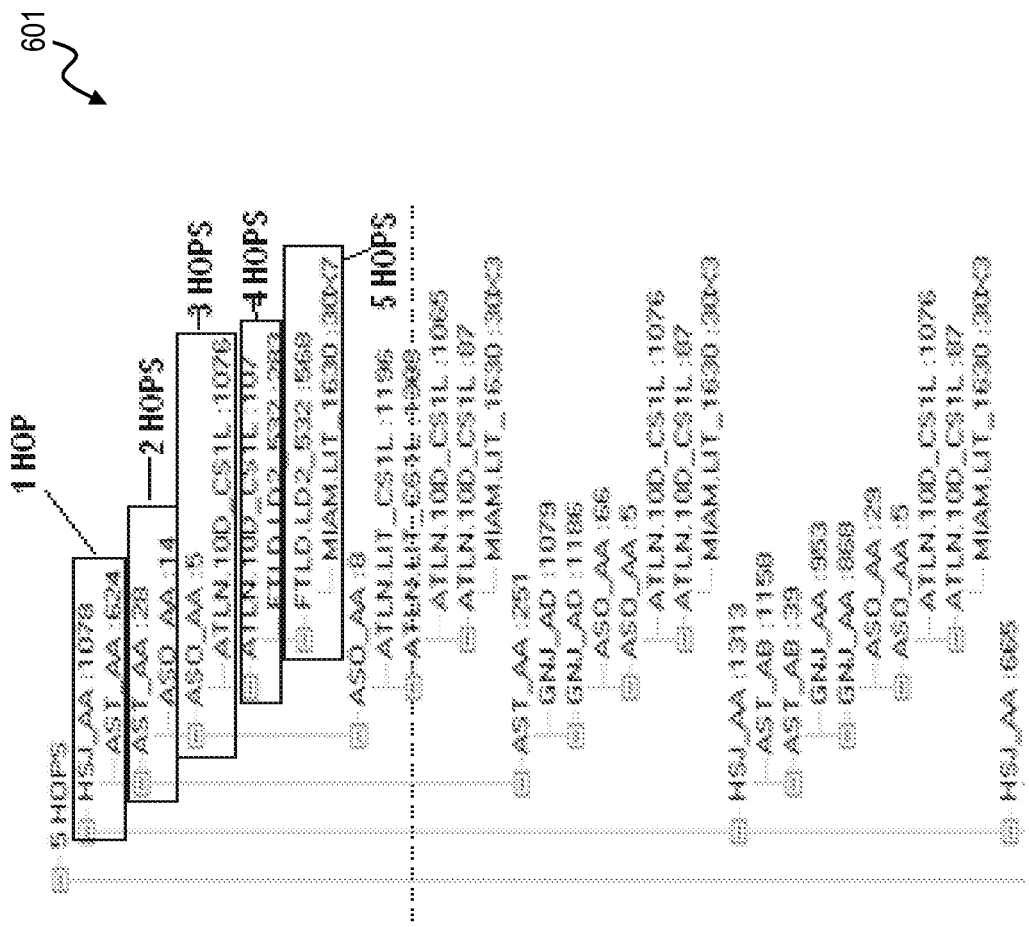
FIG. 6 is a diagram of GUI showing a branching capability in presenting the number of hops of paths, according to an exemplary embodiment.

FIG. 6 is a diagram of GUI showing a branching capability in presenting the number of hops of paths, according to an exemplary embodiment. As seen in graphic 601, each branch may represent a path's connection from one DXC to another. In this example, 5 hops are illustrated, wherein the legs of the path are provided.

Figure 7:
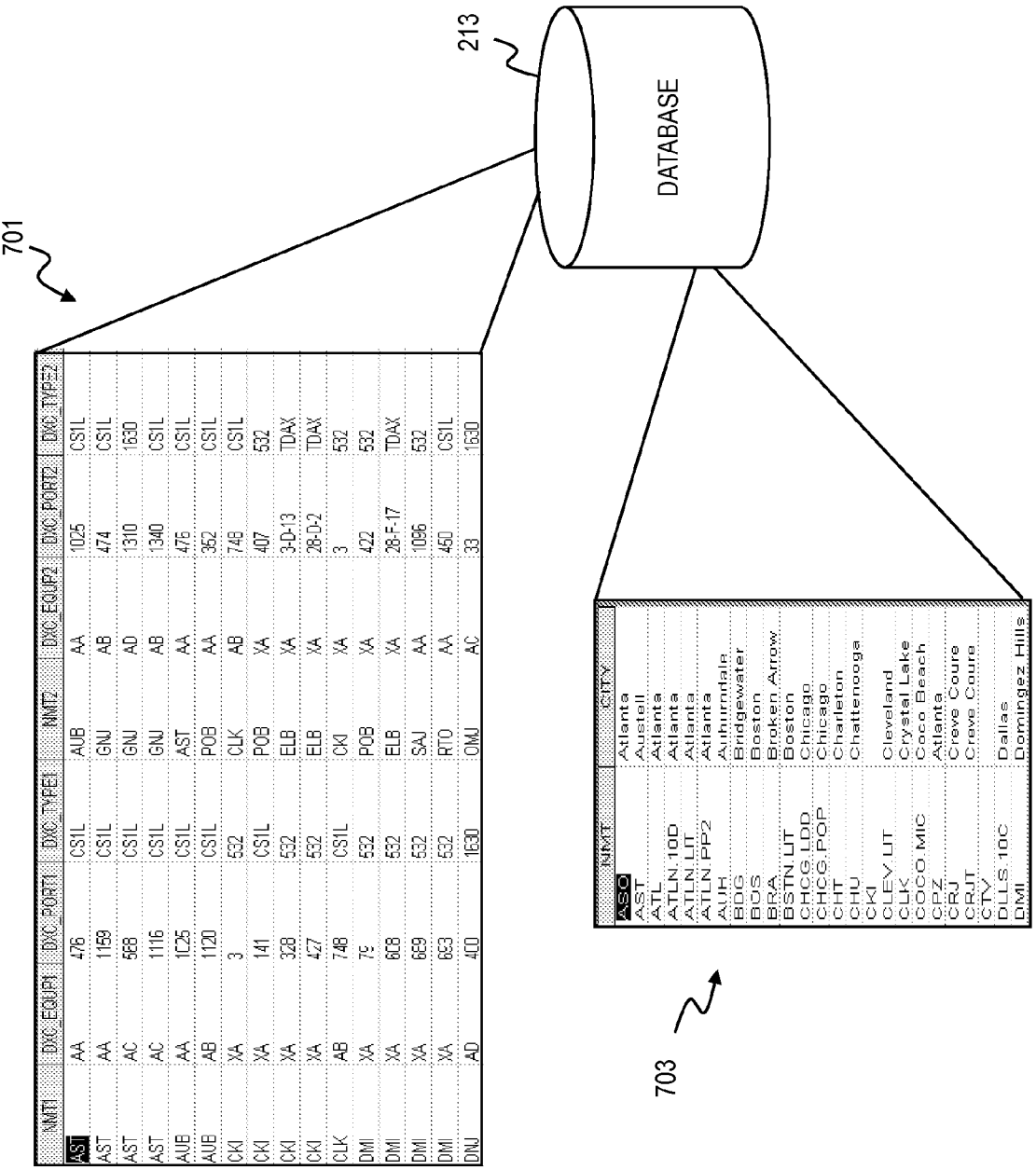
FIG. 7 is a diagram of a database configured to store information relating to path analysis, according to an exemplary embodiment.

FIG. 7 is a diagram of a database configured to store information relating to path analysis, according to an exemplary embodiment. Exemplary data structures 701, 703 relating to path analysis information can be stored in database 213. By way of example, the record of table 701 includes equipment information for the source network element and the destination network element (e.g., "NMT1" and "NMT2" respectively); the fields can include the name of the network element (e.g., "NMT" for the name of the DXC), description of the network element, port information, and type of network element.

Table 703 specifies, for example, the network element and the location where the network element resides.

The processes described herein for determining alternate paths may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
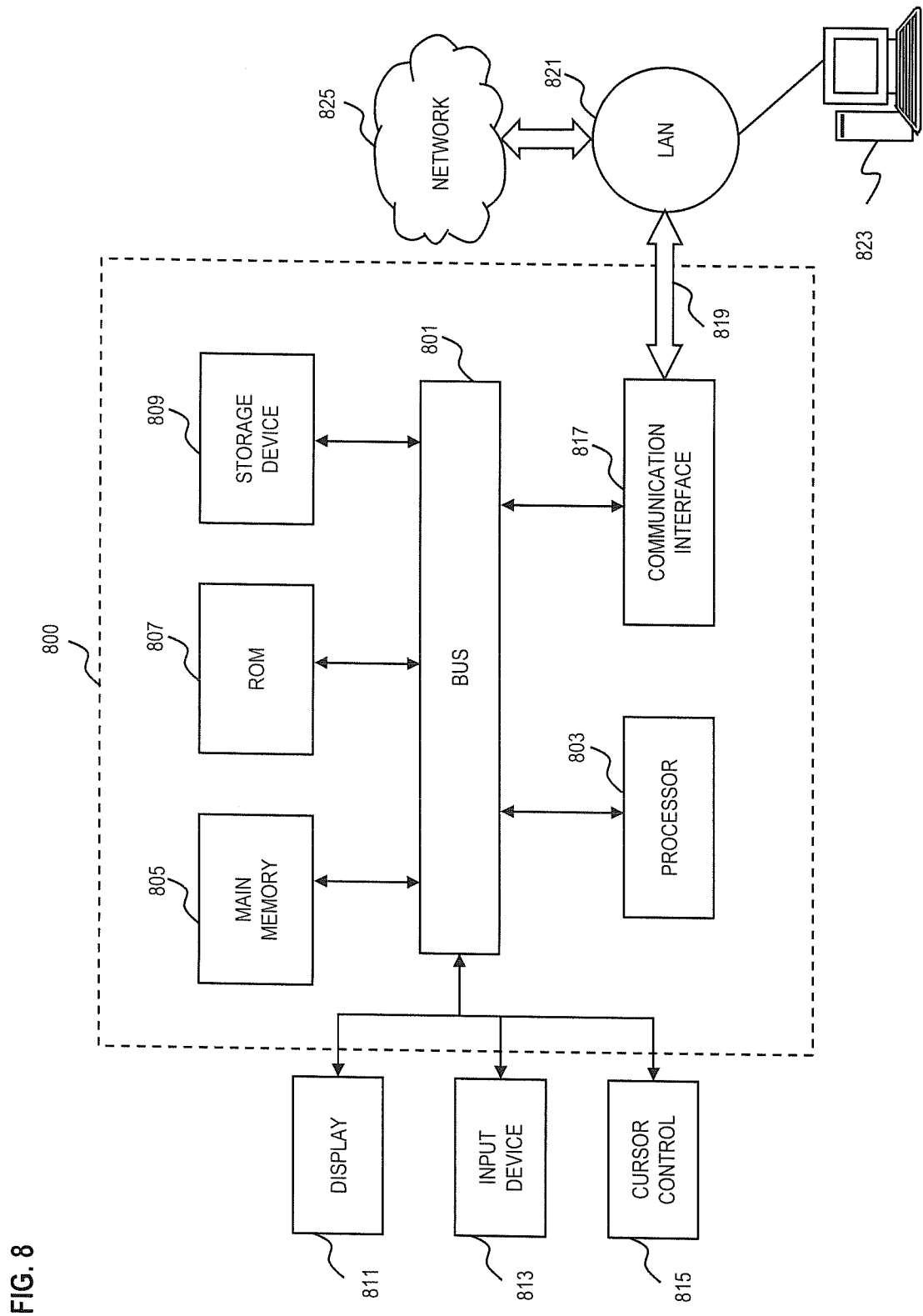
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    storing information specifying a set of available paths among network elements within a connection-oriented network;
    for each of the available paths, determining whether the path is an egress to ingress type or an ingress to egress type;
    for each of the available paths, comparing a determined number of hops with a predetermined threshold;
    for each of the available paths, determining whether a region associated with one or more of the network elements is to be excluded;
    sorting the available paths according to a predetermined criterion; and
    selectively filtering the sorted paths based on either a particular one of the network elements,
    a region associated with one or more of the network elements, or a combination thereof.

2. A method according to claim 1, wherein the network is a circuit-switched network, and the network elements include digital cross connects configured to establish the paths.

3. A method according to claim 1, wherein the connection-oriented network includes a first connection-oriented network of a first service provider and a second connection-oriented network of a second service provider.

4. A method according to claim 1, further comprising:
    selecting one of the filtered paths, wherein the selected path is established over the connection-oriented network in response to a fault detected within the connection-oriented network.

5. A method according to claim 1, wherein the predetermined criterion includes hop length, each of the paths includes one or more legs, and the paths are identified without use of circuit identifiers.

6. A method according to claim 1, wherein the stored information includes a name field, a description field, a port field, and a type field for corresponding ones of the network elements.

7. A method according to claim 1, further comprising:
    displaying a graphical user interface that includes,
        a first section for specifying an originating network element,
        a second section for specifying a destination network element, and
        a third section for providing a tree structure arranged according to a number of hops of the paths.

8. A method according to claim 1, further comprising:
    displaying a graphical user interface that includes,
        a first section for specifying the region, and
        a second section for specifying one of the network elements.

9. An apparatus comprising:
    a data collection module configured to obtain information specifying a set of available paths among network elements within a connection-oriented network; and
    a path analysis module configured to, for each of the available paths, determine whether the path is an egress to ingress type or an ingress to egress type, compare a determined number of hops with a predetermined threshold, determine whether a region associated with one or more of the network elements is to be excluded; and further configured to sort the available paths according to a predetermined criterion, and to selectively filter the sorted paths based on either a particular one of the network elements, a region associated with one or more of the network elements, or a combination thereof.

10. An apparatus according to claim 9, wherein the network is a circuit-switched network, and the network elements include digital cross connects configured to establish the paths.

11. An apparatus according to claim 9, wherein the connection-oriented network includes a first connection-oriented network of a first service provider and a second connection-oriented network of a second service provider.

12. An apparatus according to claim 9, wherein the processor is further configured to select one of the filtered paths, wherein the selected path is established over the connection-oriented network in response to a fault detected within the connection-oriented network.

13. An apparatus according to claim 9, wherein the predetermined criterion includes hop length, each of the paths includes one or more legs, and the paths are identified without use of circuit identifiers.

14. An apparatus according to claim 9, wherein the stored information includes a name field, a description field, a port field, and a type field for corresponding ones of the network elements.

15. An apparatus according to claim 9, further comprising:
a presentation module configured to display a graphical user interface that includes,
a first section for specifying an originating network element,
a second section for specifying a destination network element, and
a third section for providing a tree structure arranged according to a number of hops of the paths.

16. An apparatus according to claim 9, further comprising:
a fault recovery module configured to detect a fault within the connection-oriented network; and
a presentation module configured to display a graphical user interface that includes,
a first section for specifying the region, and
a second section for specifying one of the network elements.

17. A method comprising:
collecting topology information from a first provisioning system corresponding to a first circuit-switched network and from a second provisioning system corresponding to a second circuit-switched network, wherein the circuit-switched networks include a plurality of digital cross connects;
generating a list of available communication paths from a first one of the digital cross connects to a second one of the digital cross connects;
for each of the available communication paths, determining whether the path is an egress to ingress type or an ingress to egress type to generate the list;
for each of the available communication paths, comparing a determined number of hops with a predetermined threshold;
for each of the available communication paths, determining whether a region associated with one or more of network elements is to be excluded;
filtering the list of available communication paths based on either network element, location, or a combination thereof; and
selecting one of the available communication paths from the filtered list.

18. A method according to claim 17, wherein the list of available communication paths is determined in response to a fault detected within one of the circuit-switched networks.

19. A method according to claim 17, further comprising:
creating for each of the available paths a one-to-many relationship or a one-to-one relationship with respect to alternate paths.

20. A method according to claim 17, wherein the available paths are arranged based on hop length.

* * * * *